United States Patent [19]

Hastwell

[11] 4,062,351

[45] Dec. 13, 1977

[54] THERMAL PANEL FOR HEATING LIQUIDS

[76] Inventor: Peter J. Hastwell, 133 Mills Terrace, North Adelaide, 5006 South Australia, Australia

[21] Appl. No.: 587,806

[22] Filed: June 18, 1975

[30] Foreign Application Priority Data

June 21, 1974 Australia .............................. 7925/74
Jan. 28, 1975 Australia .............................. 0394/75

[51] Int. Cl.² ................................................. F24J 3/02
[52] U.S. Cl. ................................................. 126/271
[58] Field of Search ..................... 126/270, 271; 237/1

[56] References Cited

U.S. PATENT DOCUMENTS

| 1,889,238 | 11/1932 | Clark | 126/271 |
| 2,705,948 | 4/1955 | Rostock | 126/271 |
| 3,076,450 | 2/1963 | Gough et al. | 126/271 |
| 3,841,302 | 10/1974 | Falbel | 237/1 A |
| 3,884,414 | 5/1975 | Baer | 126/271 |
| 3,918,430 | 11/1975 | Stout et al. | 126/271 |
| 3,923,038 | 12/1975 | Cutchan | 126/271 |
| 3,943,911 | 3/1976 | Yu | 126/271 |
| 3,946,944 | 3/1976 | Keyes et al. | 237/1 A |

Primary Examiner—Lloyd L. King

[57] ABSTRACT

A solar generator panel in which a channel contains water, and has a cover which is transparent to solar radiation to allow solar radiation to pass into water in the channel whereby to absorb energy in the water from the radiation, and including an absorber for solar energy forming the front of said channel and in contact with the water to absorb, as heat, that solar energy which passes through the water, and re-radiates and conducts such heat energy back to the water.

21 Claims, 30 Drawing Figures

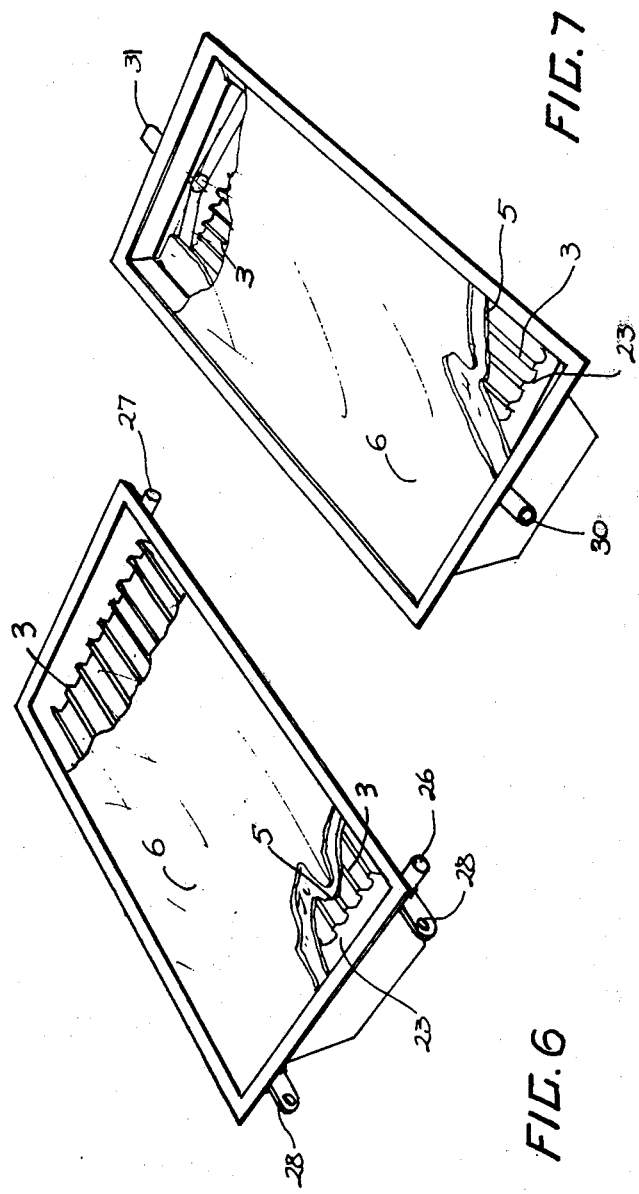

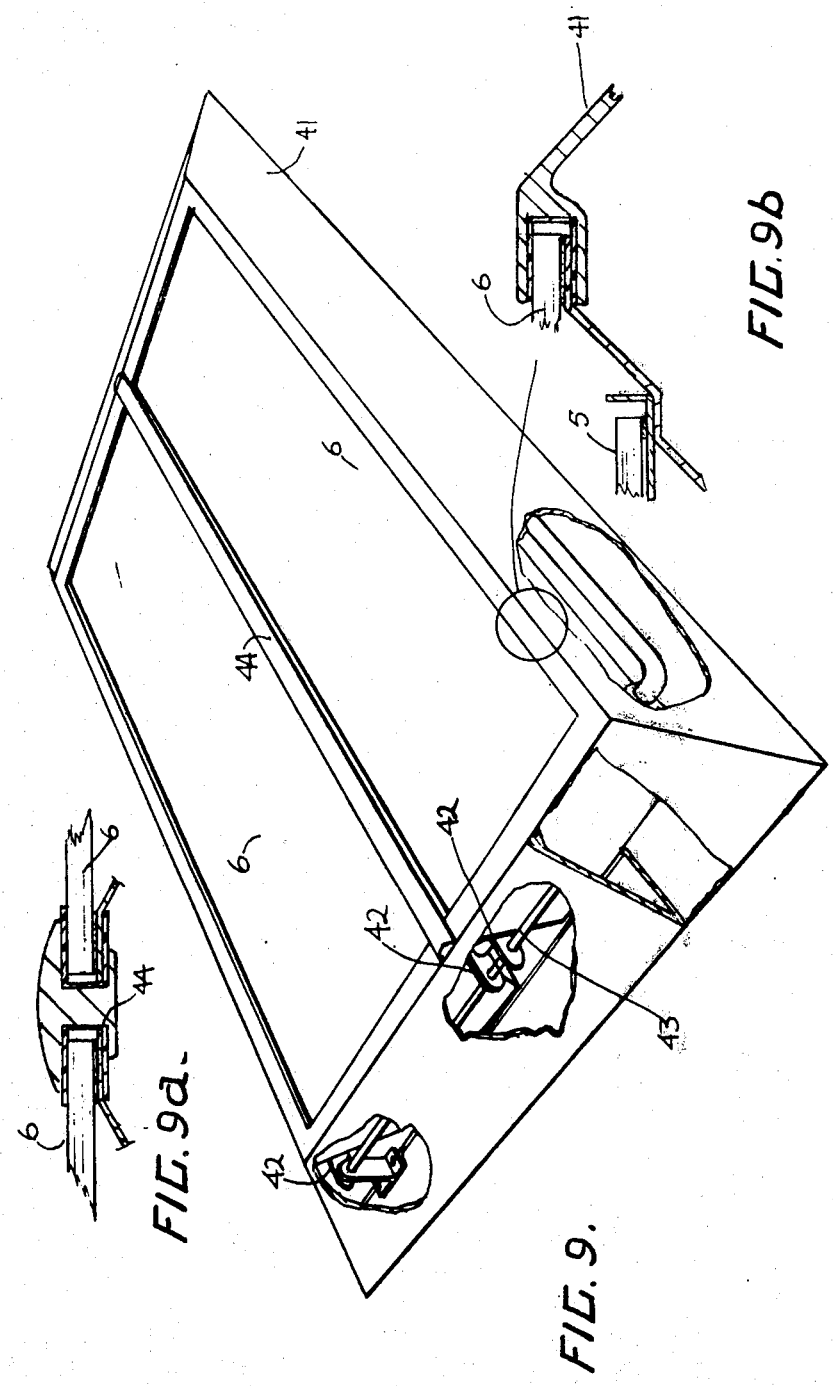

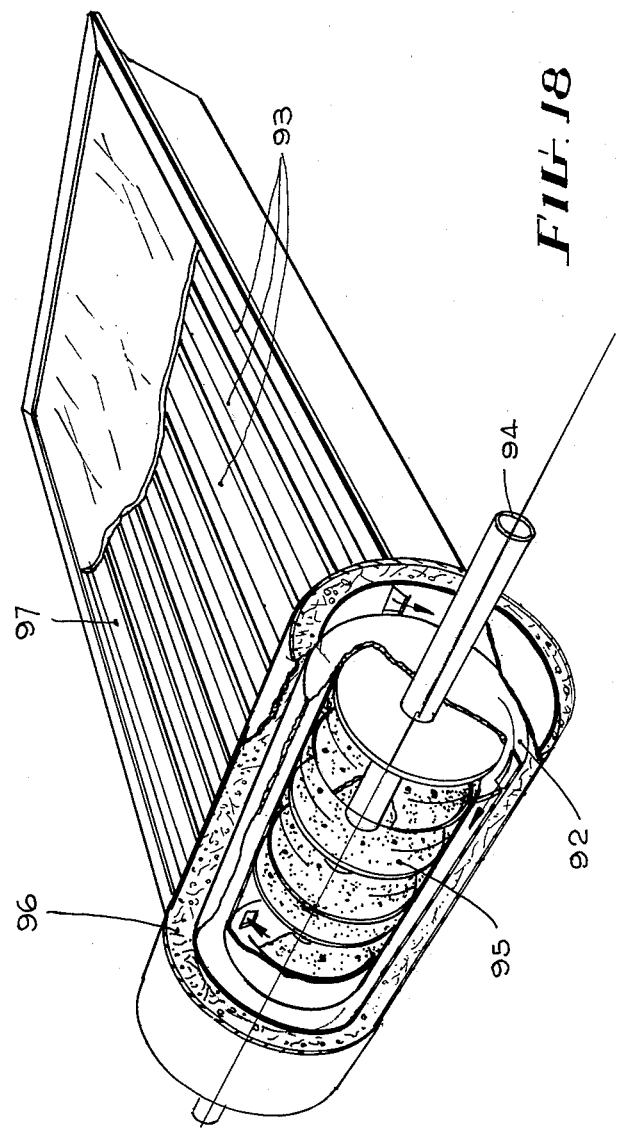

THERMAL PANEL FOR HEATING LIQUIDS

This invention relates to a thermal panel for heating liquids.

BACKGROUND OF INVENTION

With fuel shortage problems, solar heating of water is becoming more important.

There are many countries in the world where solar heating can be advantageously applied such as for household storage systems and the like but problems in the past have been to develop systems wherein good heat transfer resulted and where problems, such as contamination due to sedimentation are minimised.

A customary method of heating, for instance, the water for a household system has been to place a storage container into the roof of the building or at any other suitable locality and to connect the water from this to a solar device comprising a series of tubes through which the water flows by thermo-siphon or pumping action, which tubes are positioned on a roof or the like facing the sun, and are protected against loss of heat by enclosing the tubes in a container or panel having a glass face through which the sunlight reaches the tubes containing the water.

One of the problems with this type of assembly is to apply the heat so collected to the walls of the tubes, and more difficult still to apply the heat efficiently to the water. It has been proposed to use fins between the tubes to increase the area of heat receptive material. It has also been proposed to extrude black plastic members but plastics are bad heat conductors.

An alternative form has been to use clear tubes and to have in these a black fluid such as oil which was highly receptive of heat but this necessitated a heat exchanger within the storage means to transfer the heat from the oil to the water.

According to another form shown in the specification of U.S. Pat. No. 1,889,238 an opaque absorber sheet was placed behind a glass wall to reduce heat loss, and the back of the absorber sheet was in contact with the water so that heat from the absorber sheet was transferred to the water but from the back of the absorber sheet.

According to another form shown in the specification of U.S. Pat. No. 3,250,269 the water was confined between a front glass or plastic cover and a back reflective surface which reflected rays passing through the water back through the water. The rays thus passed twice through the water but then passed out through the front cover as reflection does not change the wavelength. While the back of the reflector was painted black, that surface had minimal absorption because of the highly reflective front surface.

THE INVENTION

The devices constructed as heretofore were reasonably successful in their use, but the object of the present invention is to provide a better heat reception and retention and also to produce a less costly system, and this we have achieved by using the water itself which is to be heated as a heat receiving medium from heat rays passing through it, and back radiating and conducting heat energy into the water, which passes through the water, by means of an absorber which has that surface which is receptive of the heat rays in contact with the water. The absorber is preferably insulated against outward radiation. Thus the heat receiving surface of the absorber is in contact with the water and radiates and conducts the heat directly into the water, but this radiation is then of a wavelength which does not pass back through a front transparent cover between which the absorber and the water is confined.

Thus according to our invention the water is exposed directly to the rays of the sun but through a transparent cover to clear glass or plastic which allows the passage of the heat rays to the water, to heat the water directly by the rays of the sun entering the body of water, but heat which is not absorbed by the water is back-radiated and conducted to the water by the front face of an absorber surface which is in contact with the water.

Thus heating of the water is firstly effected by direct absorption of heat from the solar rays, and heat not extracted during this pass through the water is changed to heat energy in the absorber and radiated and conducted into the water whereby a highly efficient heat absorption from solar energy results with direct heating of the water.

The invention is directed to various features, as will be seen from the following description, such as the use of the principle in general to heat dwellings, the use of panels according to the invention as part of a roofing material, the use of translucent panels which absorb the rays of the sun to heat the water of swimming pools, and various other features to be later described.

In order however that the nature of the invention can be fully appreciated, a description will now be made with reference to the accompanying sheets of drawings in which are shown various embodiments to which the invention need however not necessarily be limited.

BRIEF DESCRIPTION OF THE DRAWINGS

FIGS. 6 and 7 show how the feed to the panels can be varied, FIGS. 8, 8a and 8b how heating of an air space above the water level can be avoided, as such a heated air space could cause failure of the structure, FIG. 9 is a detailed view of the construction of a panel, as are also FIGS. 9a and 9b.

FIG. 18 shows a heat storage panel.

PREFERRED EMBODIMENTS

Figure 1:
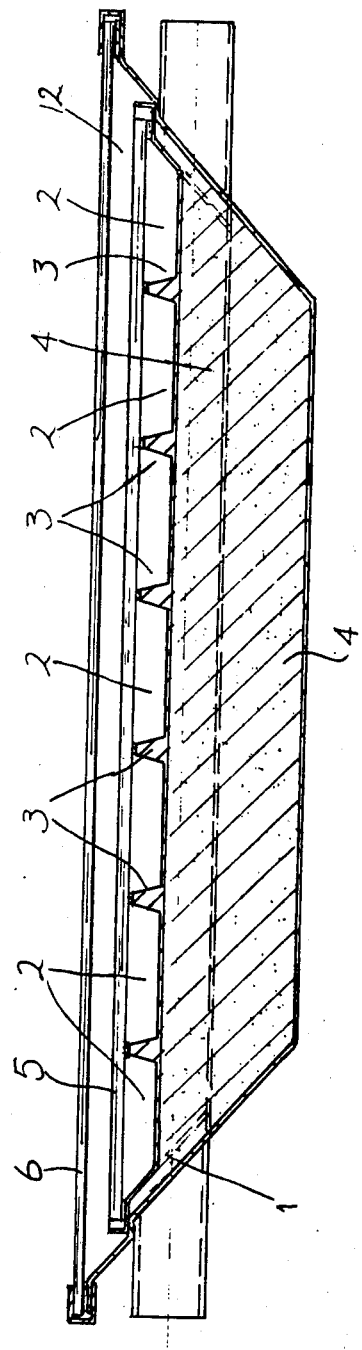
FIG. 1 is a transverse section of a panel comprising a transparent cover such as glass forming the cover of a channel which has, at the back a heat absorber which is insulated on the outer side to ensure the maximum radiation of heat from this surface into the body of water, the expression "transparent" including "translucent"

The panel basically comprises a shallow trough 1 having a series of channels 2 formed in it by upstanding walls 3, the rear of the trough being thermally insulated by a suitable low density material 4 such as plastic foam.

Over the trough 1 is a glass cover 5 which is sealed to the trough 1 around its edges and to the upstanding walls 3 so that while the sides and bottom of the trough are defined by the trough 1, the top is defined by the cover 5.

Rays of the sun can therefore pass through this cover 5 into the body of water which flows in the channels 2 where a large part of the heat will be absorbed.

To give an insulated air space above the glass cover, a second glass cover member 6 is positioned between it and the entering rays of the sun, spaced a short distance from the cover 5 which is contacted with the water, so that there is quiescent air area between the upper member and the cover which is in contact with the water to prevent loss of heat by re-radiation from the cover 5.

The trough 1 itself is insulated around the sides and the bottom by the low density material 4 to prevent heat loss to the atmosphere, and the trough is preferably formed of a material which itself is black, or is painted or finished at least on the front in a matt black colour or has a matt black surface applied thereto where it is in contact with the water to form an absorber so that any rays passing through the water which are not absorbed by the water will be trapped by the absorber and because the trough is insulated externally against heat losses by the material 4, such heat will be passed back to the water. The back of a panel can form the ceiling for the structure and could be an acoustic ceiling member.

The absorber can be black paint applied on the inner surface of the trough, or can be a black plastic lining. The trough can itself be moulded from low emissivity material or can have an aluminum backing but it is preferable to back the trough with a low density thermal insulating material. The absorber may be a black plastic water glass combination.

Figure 2:
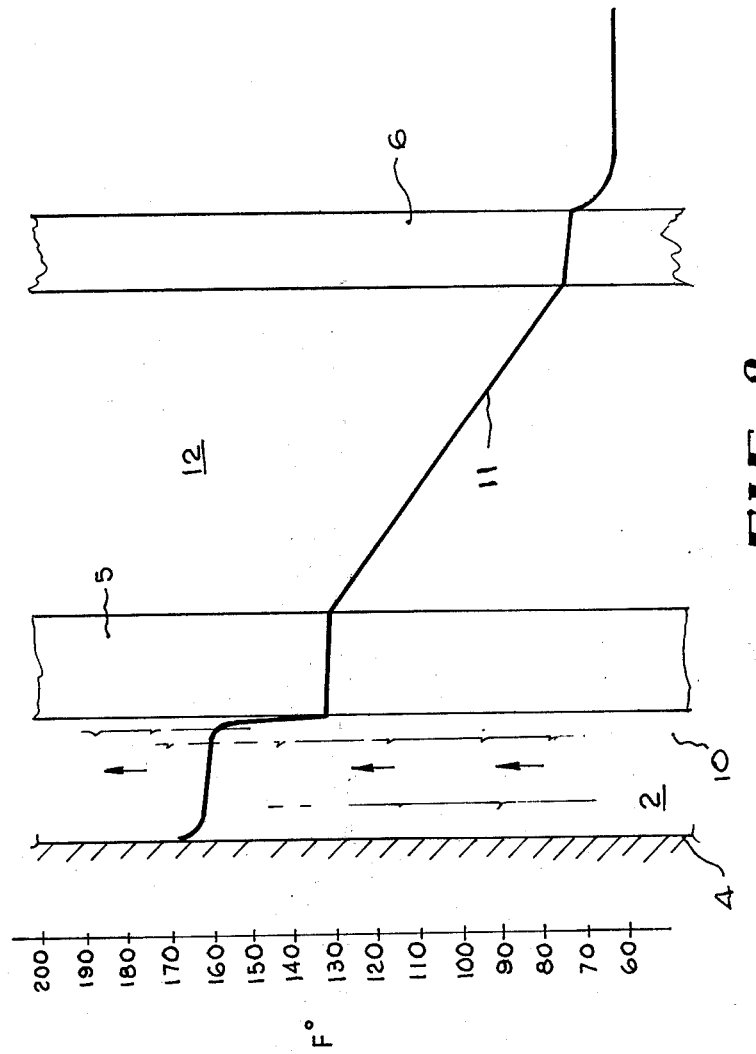
FIG. 2 is a temperature profile showing how when a pair of spaced glass covers are used with a back absorber to define a water channel between the inner wall and the absorber, the temperature rises from 60° F ambient to approximately 170° F at the absorber.

We have found that such an assembly is highly effective in absorbing the suns rays in the water itself, and a reference to FIG. 2 shows clearly how the heat is applied to the water. The absorber surface is designated 9.

In this system the water 10 which is confined to flow between the cover 5 and the floor absorber surface 9 of the trough 1 was found to reach a temperature of 160° F for an ambient temperature of 60° F, the line 11 of the graph showing how the temperature rise occurs as the rays travel first through the glass member 6, then through the air space 12 between the member 6 and the glass cover 5, then through the cover 5 which of course has its rear interface in contact with the water 10, the heat rays not absorbed by the water then being trapped in the absorber 9 which forms the back of the trough 1 and which is insulated againt loss to the atmosphere by the material 4, the heat energy from the absorber then passing by radiation and conduction back to the water.

It is clear from this figure that there is a gradual build up of heat into the water as the water is confined between the cover 5 and the absorber surface 9, and consequently heat is trapped with a high degree of efficiency.

It is of interest to note here that radiation of the heat from the trough 1 is back into the water 10, and as a change occurs in the wavelength of the energy which is radiated from the absorber 9 back into the water, this radiation, if not fully absorbed by the water strikes the rear surface of the cover 5 but is not transmitted through it but goes into the water the effect thus being to trap a very high percentage of the heat energy from solar radiation in the water itself.

The temperature profile of FIG. 2 was obtained by assuming an inner temperature at ideal conditions because obviously the temperature of the water would vary as the flow rate.

Figure 3:
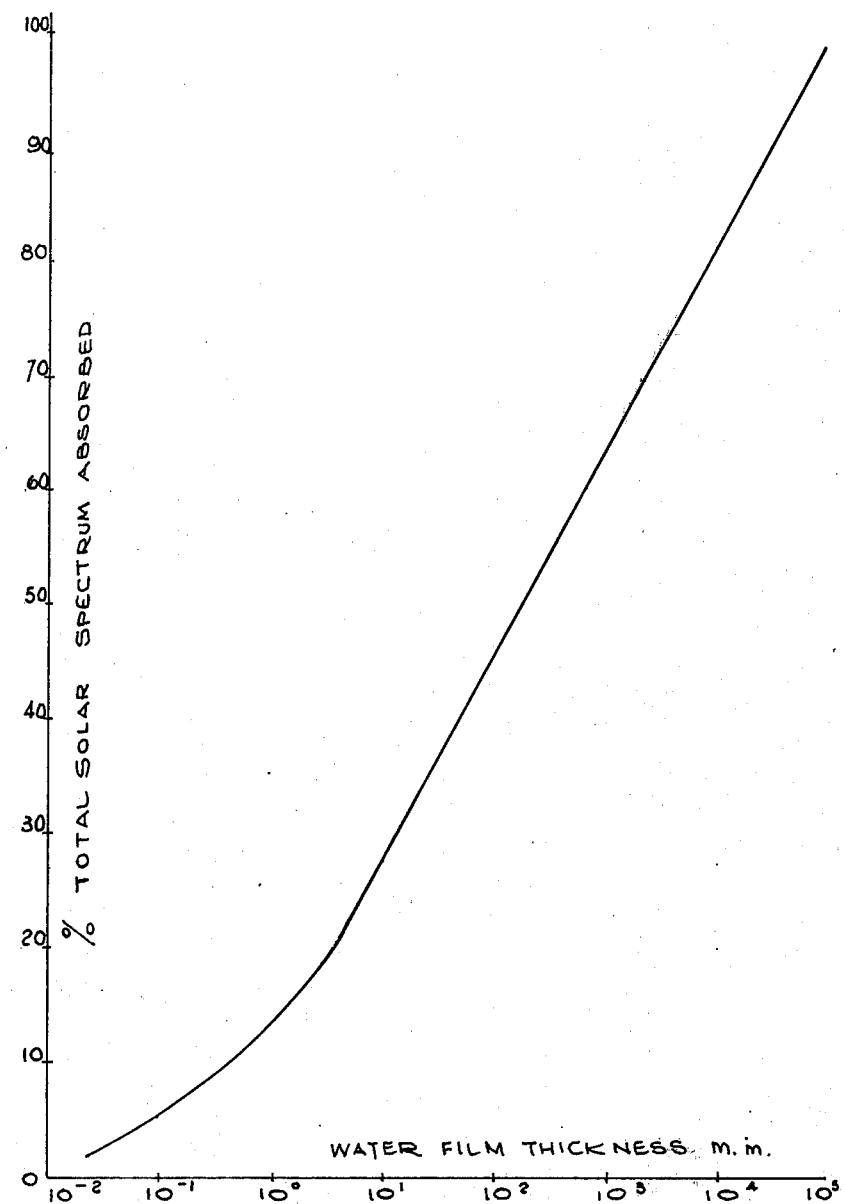
FIG. 3 is a graph showing the relationship of water thickness to the absorption spectrum.

FIG. 3 shows the absorption of solar energy by the water and it will be noted from this that there is a relatively gradual absorption, a 10 millimeter film of water absorbing approximately twenty five percent of the total solar spectrum but if this film is increased to $10^5$ millimeter, the absorption is substantially 100 percent.

It will be clear however from a reference to FIG. 2 that the thickness of the film of water need not be very great, and generally a thickness of perhaps one centimeter is quite adequate because of the heat trap effect which exists and is shown in FIG. 2 and which is materially intensified because firstly the cover 5 cannot radiate very much heat back through the air space 12 and therefore as is shown by the line 11 immediately below the cover 5, there is a high heat transfer from this cover to the water, and the water rapidly absorbs this heat, but any not absorbed which passes through to the absorber 9 of the trough 1 is back radiated and conducted into the water and as previously stated because of the change in wavelength the back radiation does not pass through the cover 5 but is trapped and passes to the water.

It will thus be seen that a relatively shallow body of water positioned to receive the rays of the sun, but in contact with a transparent cover on one side so that the rays of the sun can pass through the cover into the water to heat the water but any not absorbed is changed to heat energy by the absorber and is radiated and conducted back to the water with a minimum of loss. It can be shown that to heat the water by the suns rays is highly efficient because the characteristic absorption in terms of wavelength of light is extremely high at for instance the infra red wavelength so that a low depth of water will effectively absorb a relatively high percentage of the heat.

While glass is referred to as the material of the cover, it will be realised that other substances which allow the heat rays to pass through it into the water can be used, such as transparent heat resistant plastics. Compound structures are possible as will be described later with reference to FIGS. 11 and 12.

Generally it is satisfactory to have a shallow trough which for instance could have a dimension of say 30 centimeters wide by 120 centimeters long and a depth of one to four centimeters in which the water is contained, the lower limit being set by practical flow rates to avoid boiling, such as trough having been found to be highly effective and free of the problems which exist when for instance relatively small tubes are used as in the prior art where gas bubbles can be a problem if the water is heated to a temperature sufficient to cause boiling of the water.

Referring now more particularly to the construction of the panels, reference will be made to FIG. 4 which shows the problem which exists in fixing a transparent cover 5 when made of glass to a trough 1. It will be noted in FIG. 4 (a) that the ideal situation is where the glass is supported on the edges of the trough 1 as well as on the upstanding walls which extend longitudinally along this trough to form the series of channels, and the most effective way known to us of fixing the glass is to use a common adhesive for both the glass and to the material of the trough, but if the areas of contact of the adhesive with the glass were all uniform the effect shown in FIG. 4 (b) would result in that the greater collective pressure at toward the centre of the glass cover would tend to bulge the cover somewhat as shown in that Fig.

Figure 4:
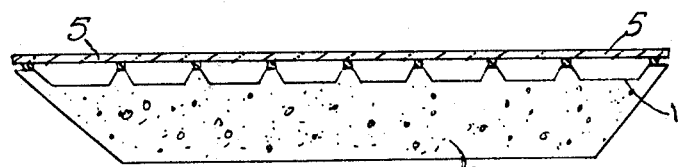
FIG. 4 shows how it is necessary to carefully support the glass cover to avoid fracture, (a) showing the glass secured by adhesive to the channel forming material, (b) showing how the glass tends to bend when under pressure, (c) showing how this can be avoided by varying the dimensions of the adhesive line thickness or alternatively as in (d) the depth of adhesive used, (e) showing how distortion is minimised on a panel constructed according to the invention.
Figure 4A:
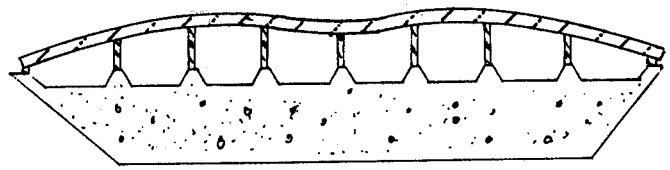
Figure 4B:
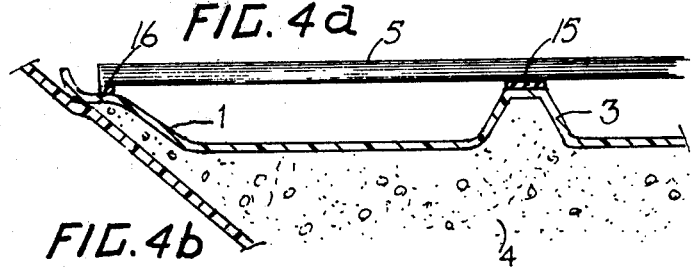
Figure 4C:
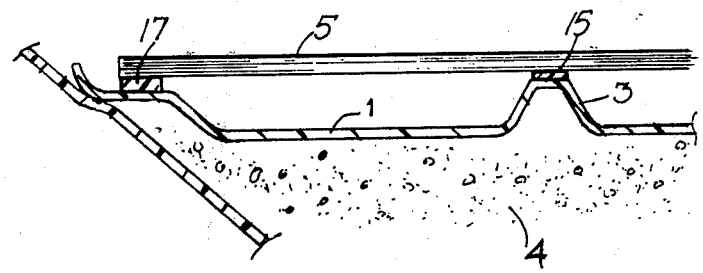
Figure 4D:
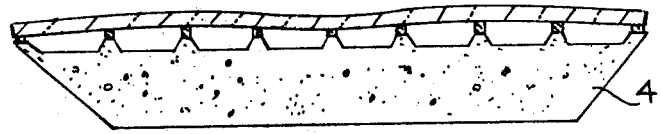

To overcome this problem we have found that two methods can be used one being the use of relatively wide adhesive lines on the upstanding walls 3 as indicated by 15 in FIG. 4 (c) and narrow adhesive lines 16 around the edges of the glass cover 5, or alternatively the proportioning can be achieved as in FIG. 4 (e) by having the adhesive line 15 as in the previously described embodiment but having a deeper adhesive line 17 around the edges so that there is a greater resiliency in the adhesive line which joins the edges of the glass cover 5 to the trough 1.

In FIG. 4 (e) is shown the measured deflection of the glass panel 5 under actual conditions provided the adhesive lines are of the correct proportions.

It will be realised of course that if the adhesive used is black and is a poor conductor of heat it reaches high temperatures and if the adhesive lines are too wide say 2 to 3 centimeters, a hot spot will be generated in the centre of the adhesive which would cause failure and therefore it is desirable in panels of the nature described and of the dimensions referred to use adhesive lines of perhaps ½ to 4 millimeters thick with a width of 5 to 7 millimeters.

Referring now to FIGS. 5 to 9 inclusive, the trough 1 is formed of a suitable material to have an edge 20 on which the glass cover 5 rests and to have the upstanding walls 3 which form supporting means for the glass along intermediate lines but also divide the water spaced into a series of channels to aid the general flow through the system particularly when the panel is inclined to the horizontal as is the preferred form, so that water flows from one end of the panel to the other end thereof.

The water flows into an inlet 22 into a distributor channel 23 and after flowing along the channels is collected by a similar distributor at the other end which communicates with the outlet 24.

This whole assembly is held in a housing 25 which is adapted to receive the just described panel and its associated cover and outer cover member, with the inlet 22 and outlet 24 meeting with an inlet 26 and an outlet 27 which are sealed to the trough 1 so that water does not flow into the space between the bottom of the trough and the bottom of the housing, the space between the bottom of the trough and the housing being of course filled with the insulating material which can be a foam plastic and which may be formed in situ or applied in any other way.

Such a panel can be provided with mounting brackets 28 whereby it can be attached to a suitable support.

FIG. 6 shows a completed panel with the inlets 26 and outlets 27 and includes also the upper glass 6.

In FIG. 7 is shown a similar construction but in this case the inlet is represented by 30 and the outlet by 31, this form of structure being more suitable where the inlet and outlets require to be positioned in line with a longitudinal dimension of the panel.

Figure 5:
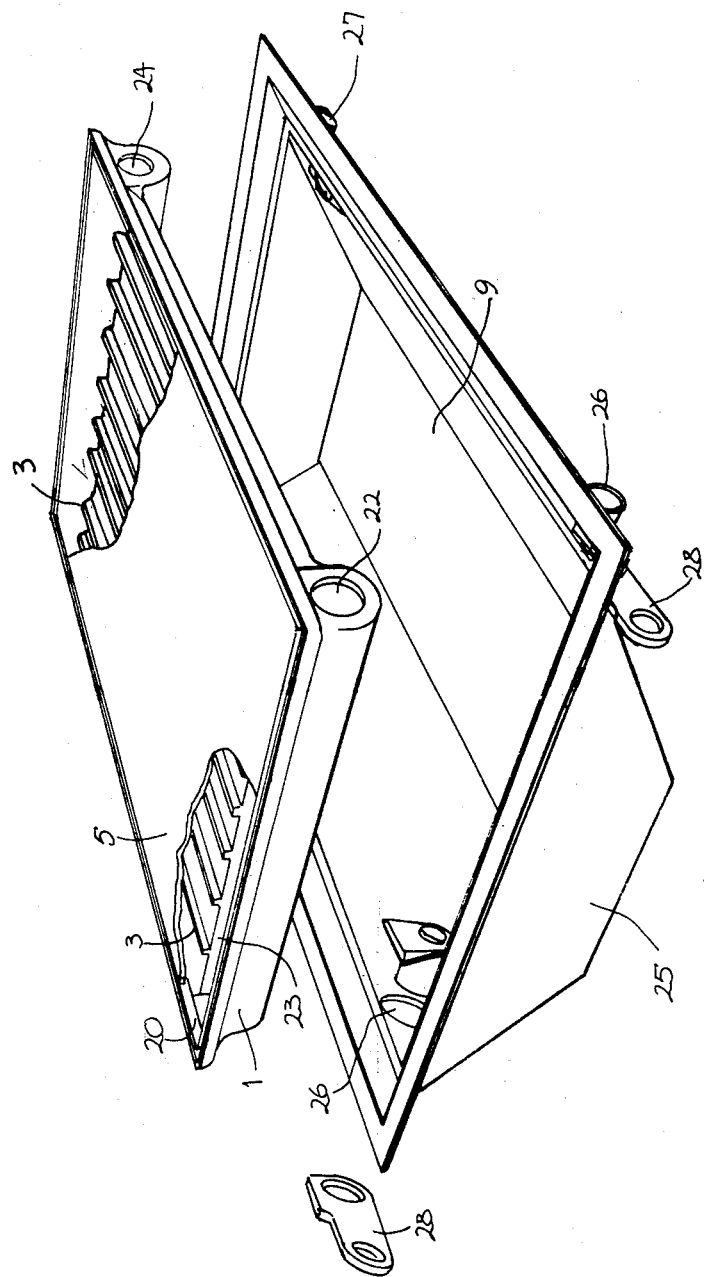
FIG. 5 is a perspective view of a panel before assembly.

An advantage of the construction shown in FIG. 6 is that a series of panels can be joined side-by-side by simply interconnecting the respective inlets provided as shown in FIG. 5 both the inlets 26 and the outlets 27 communicate through both sides of the walls of the panel.

Figure 8:
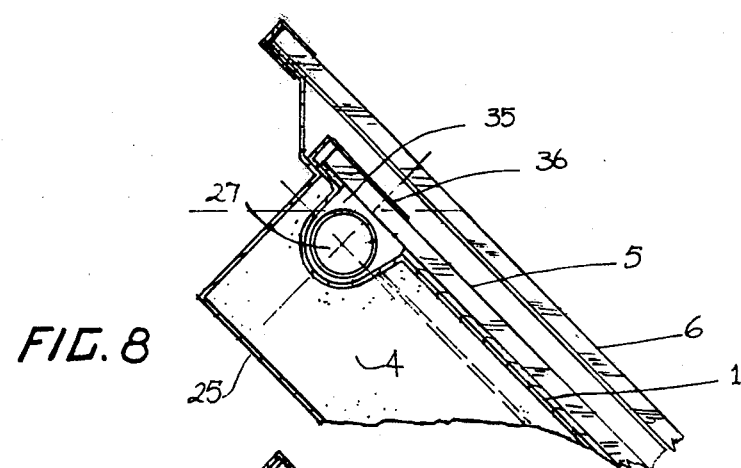
Figure 8A:
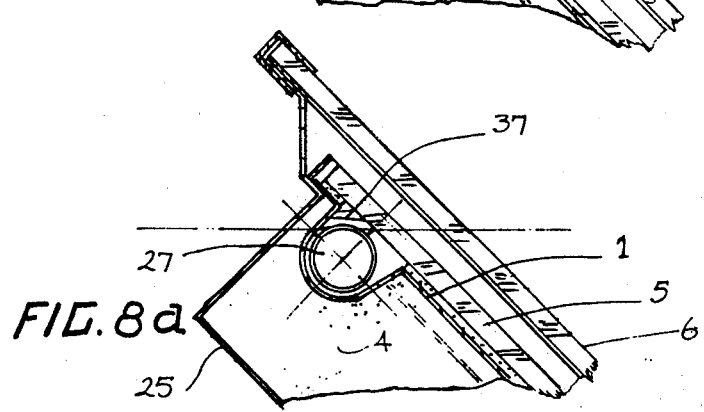
Figure 8B:
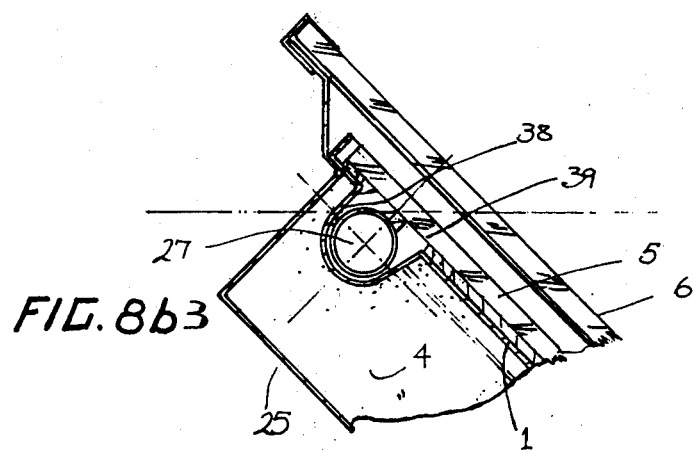

In FIG. 8 is shown particularly how to avoid a problem which can occur at the outlet 24 in that it will be realised that when the panel is inclined as shown in that illustration, the water will flow through the outlet 24 but will leave an air pocket 35 beneath the glass 5 and this air pocket will become very hot as heat is not carried away from that locality and may cause failure.

Consequently it is necessary to shield this area which can be achieved as shown in FIG. 8 (a) by having a shield 36 on the glass to prevent the rays of the sun from striking the glass at this locality, while in FIG. 8 (b) the problem is solved by inserting a reflective insert 37 into the mould to fill the void which would otherwise be an air space, while in FIG. 8 (c) the moulding itself is so effected that the space 38 is part of the moulding so that heat generated at this point will be carried away by the moulding itself but in that case again it would be desirable to place a white or reflective shield 39 over the area to prevent heating by the rays of the sun.

In FIG. 9 is shown how a pair of such panels can be placed into a cover 41 by having brackets 42 attached to the housing of the panels and supporting these on rods 43 at each end, and to seal this structure at the junction between the two panels, a moulding 44 is used which fits along the medial line between the two panels and which is illustrated more particularly in an enlarged portion indicated by the letter "B".

The cover 41 conceals the pipe work and prevents the wind from cooling the water in the pipes.

Figure 10:
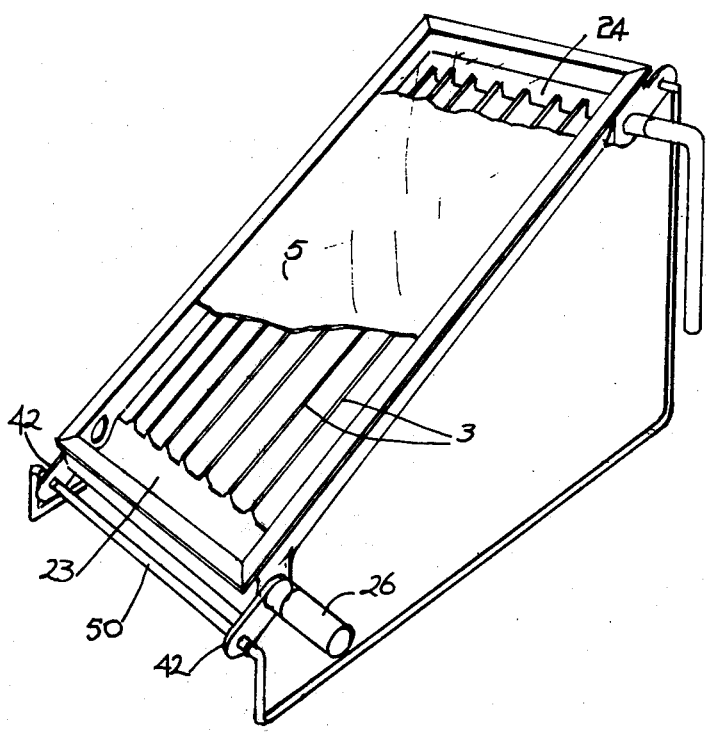
FIG. 10 shows how the panel can be mounted for receiving solar energy.

In FIG. 10 is shown an alternative mounting in which the brackets 42 are engaged on a rod 50 which is bent to form a support, in this case the panel being without the back insulation so that it is more usable as a low temperature fluid heater for swimming pools or the like or as a preheater for a high temperature panel, such a unit having been found still to be very much more efficient than previous low temperature heaters.

Figure 11:
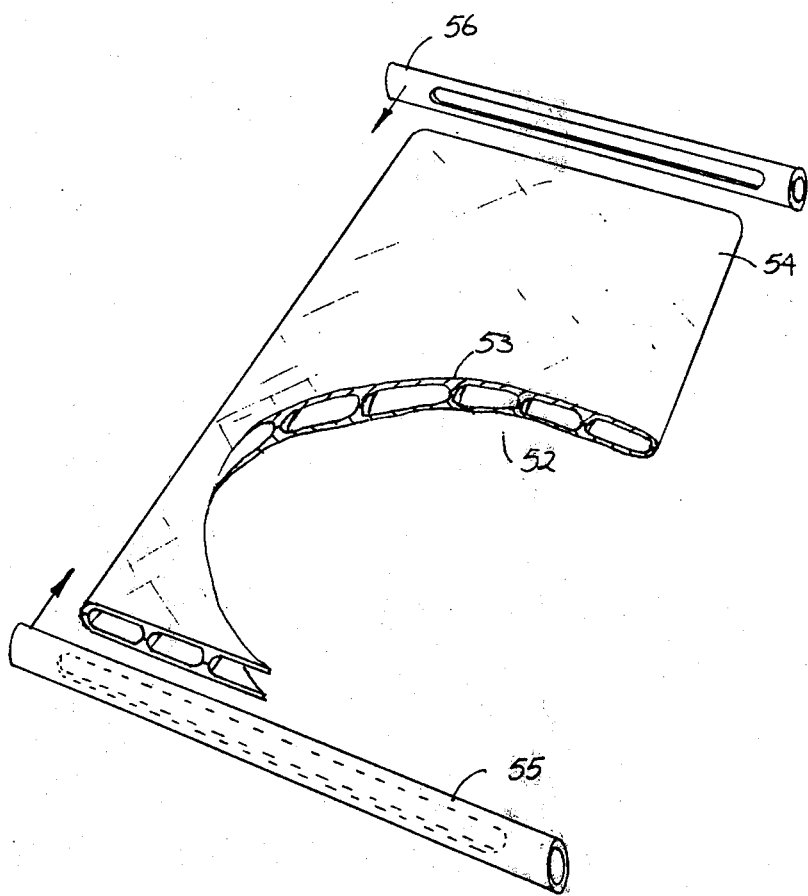
FIG. 11 shows how a panel could be formed by using a moulding having different material characteristics on the two sides of the panel.
Figure 12:
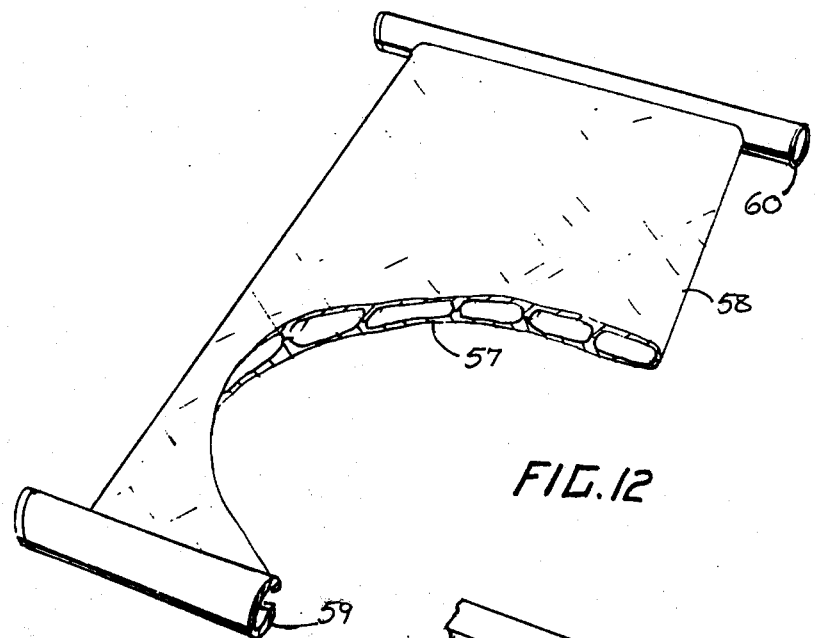
FIG. 12 is a similar view showing how the panel can be formed in two parts, FIGS. 12a and 12b showing parts of the panel prior to joining.
Figure 12A:
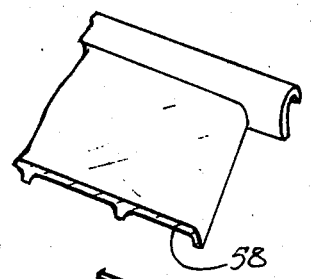
Figure 12B:
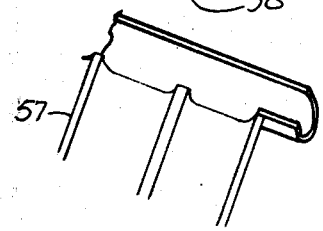

The form shown in FIGS. 11 and 12 have been previously referred to in that they are in the nature of mouldings and in FIG. 11 comprise a lower section 52 and an upper section 53 shaped when joined together to form a series of tubes in the one body 54 and to these are then added headers 55 and 56 which form respectively the inlet connections and the outlet connections for the unit.

In FIG. 11 the member 54 is in the nature of an extrusion which can be formed in any length but using a black plastic as the lower portion of the extrusion and a clear plastic as the upper portion of the extrusion so that a unitary multiple channel member results which can then have the end headers attached thereto.

In FIG. 12 the same construction is used but in this case the mould is split down the centre and the lower mould 57 is formed of a black plastic while the upper mould 58 is formed of a clear plastic and as shown in the fragmentary views (a) and (b) of this Fig., the section 57 is such that it can be cemented to the section 58, the headers 59 and 60 then forming an integral part of the mouldings.

Figure 13:
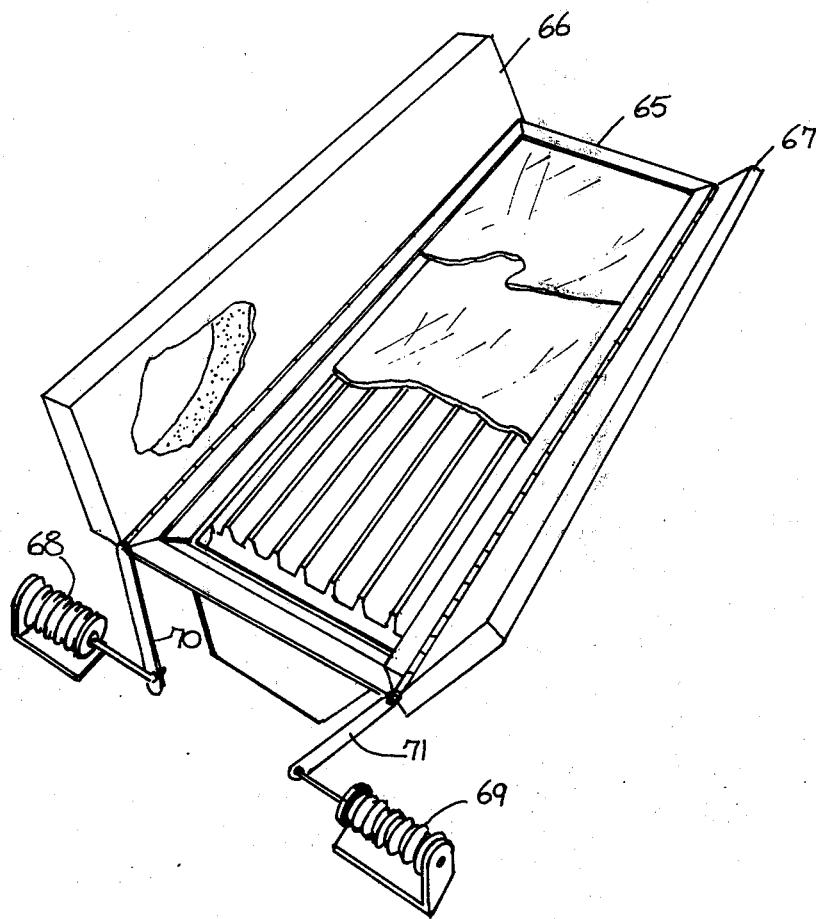
FIG. 13 shows how a panel can be fitted with temperature actuated heat insulation covers to prevent heat loss when solar energy is not available to heat the panel.

In FIG. 13 is shown how a panel 65 of the general type earlier described can have insulated or other movable shields 66 and 67 hingedly attached along the edges of the panel and these can be operated by expansion bellows 68 and 69 through the rods 70 and 71 to move the shields 66 and 67 to either intercept the rays of the sun or in cases where the device is used as a storage heater and water is heated in the space for subsequent use, these panels close down when there is insufficient thermal energy to maintain the temperature so as to then avoid the loss of the heat stored in the water of the unit back to the atmosphere.

Figure 14:
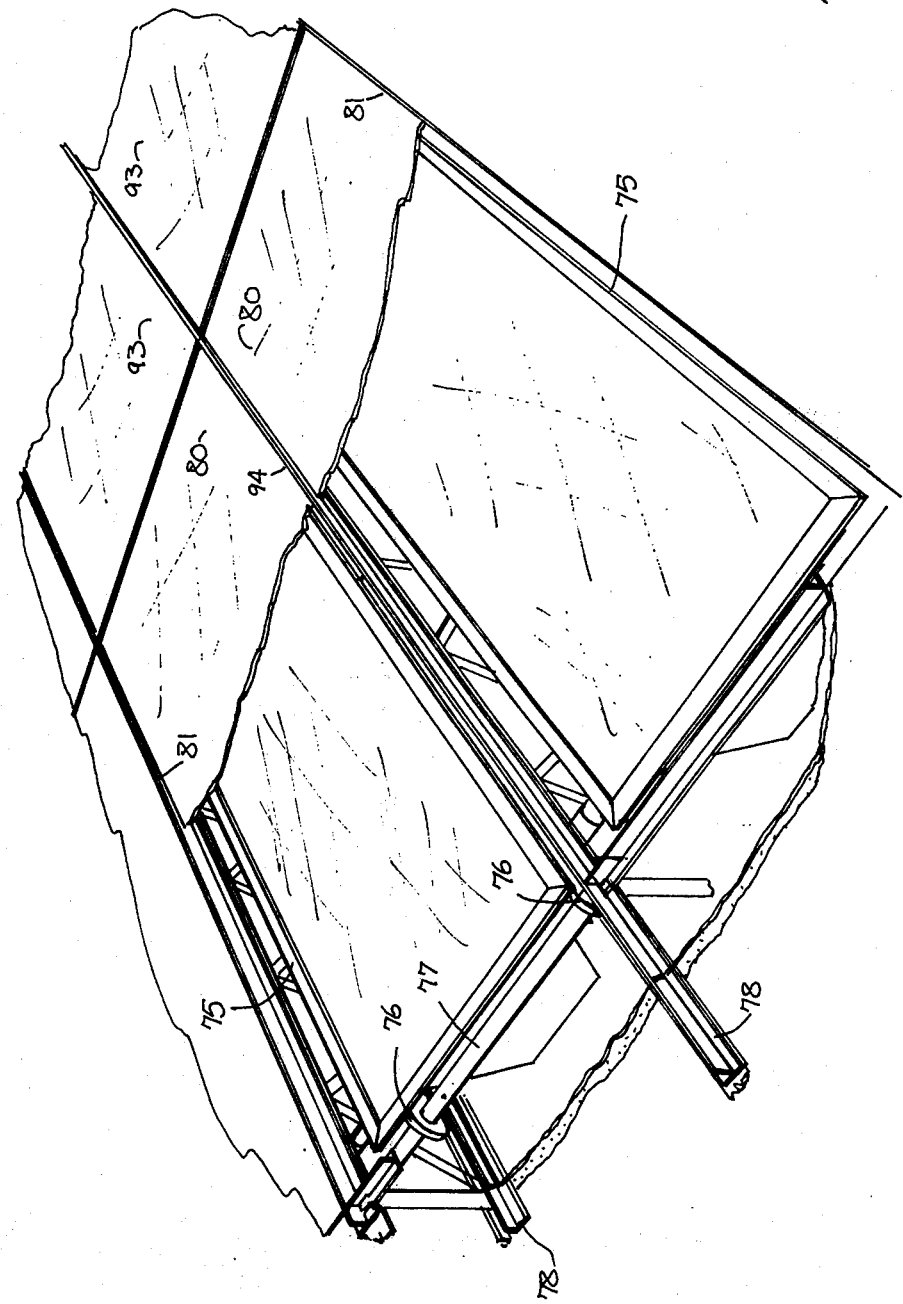
FIG. 14 is a perspective view showing how solar panels can form part of a girder structure supporting a roof.

Referring now to FIG. 14, this illustrates how the panels in this case designated 75 can be attached by means of their mounting brackets 76 to transverse members 77 forming part of a girder structure 78 which supports a roof, the assembly in such a case having the upper glass member 80 which correspond to the upper glass member 6 in the first embodiment positioned to engage webs 81 defining the edges of the panels 75 and sealed to the structure in such a way that while the rays of sun can penetrate this upper layer of glass, water is shed from the roof. The glass members 80 can be waterproofed in any way such as by fitting members similar to the mouldings 44 referred to in FIG. 9 while upper and lower edges can overlap in the manner of tiles to ensure that water will shed over the joints in flowing down a slope.

Figure 15:
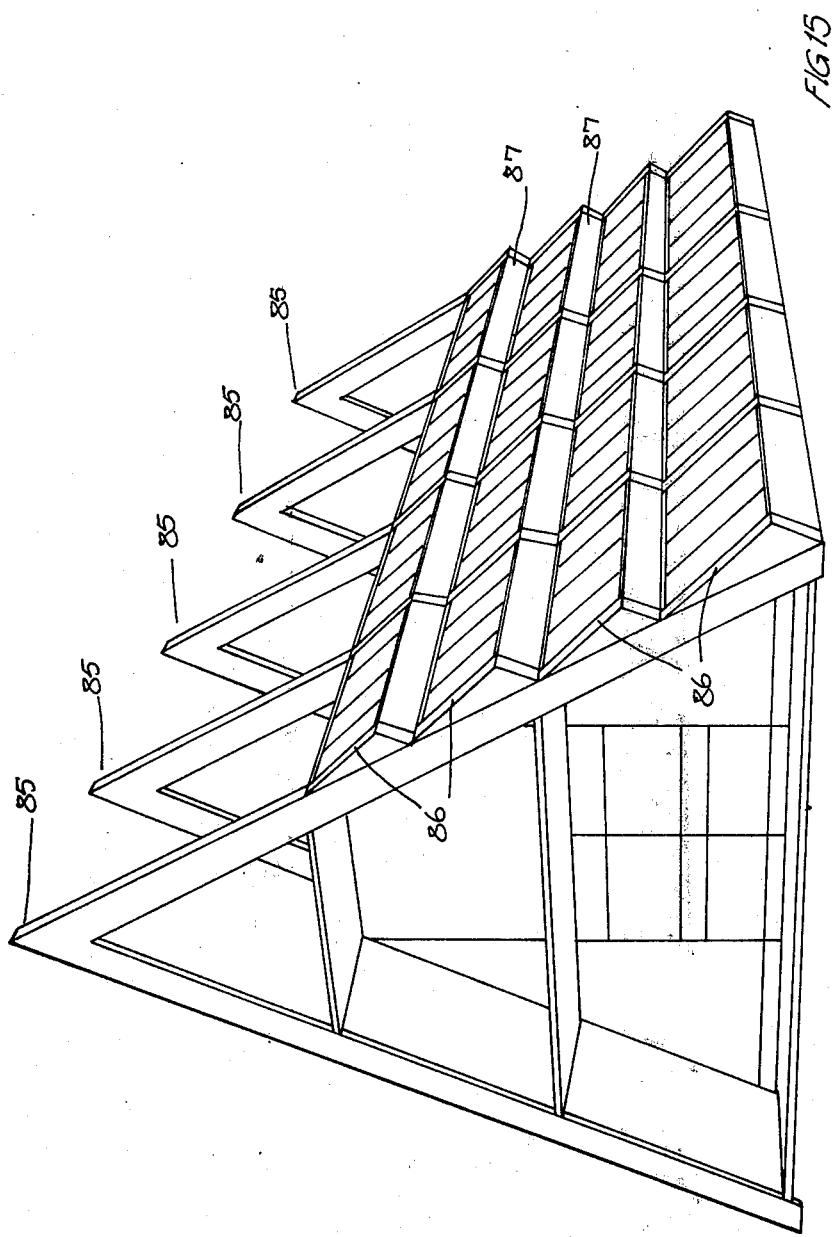
FIG. 15 shows a solar heated building.

In FIG. 15 is shown an "A" frame structure in which a series of "A" frames 85 support a series of panels 86 of any of the types earlier described, with windows 87 formed therebetween, the relevant wall of course facing in the direction of the sun to ensure that the structure so formed which can be a dwelling or any other form of housing or factory, will have the necessary heat energy supplied to it by the panels 86.

Figure 16:
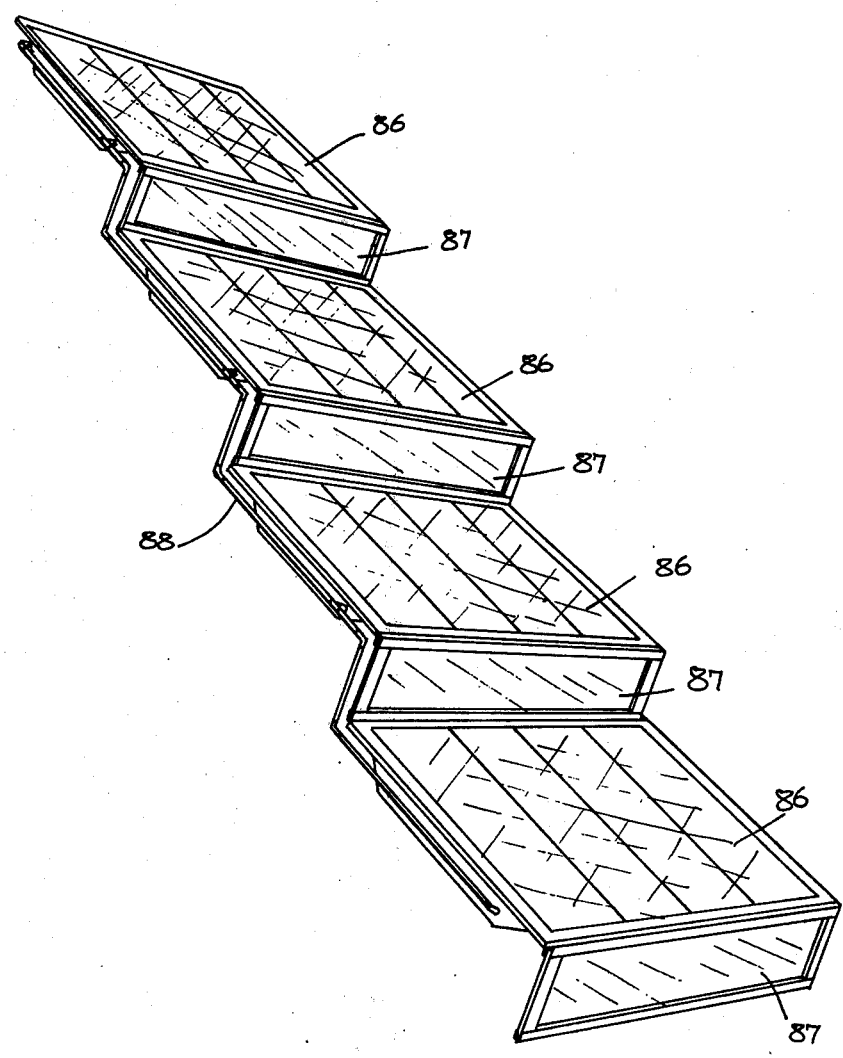
FIG. 16 shows how solar panels can be arranged to give parallel flow.

FIG. 16 is a detailed view of FIG. 15 showing how the panels 86 are arranged side-by-side at different levels and can all be joined together by flow lines 88, which of course can be widely varied according to whether parallel or series flow is required, but this view again shows the advantages of having the inlets and outlets transversely positioned in relation to the panels so that the panels can be placed side-by-side to have a common inlet and outlet line to each, thus avoiding excessive flow lines and only the series of panels need to be interconnected where for instance as in FIG. 16 they are positioned at different locations on a sloping surface. The flow line 88 in this case connects all the inlets, there being a similar line on the other side which would connect to all of the outlets.

Figure 17:
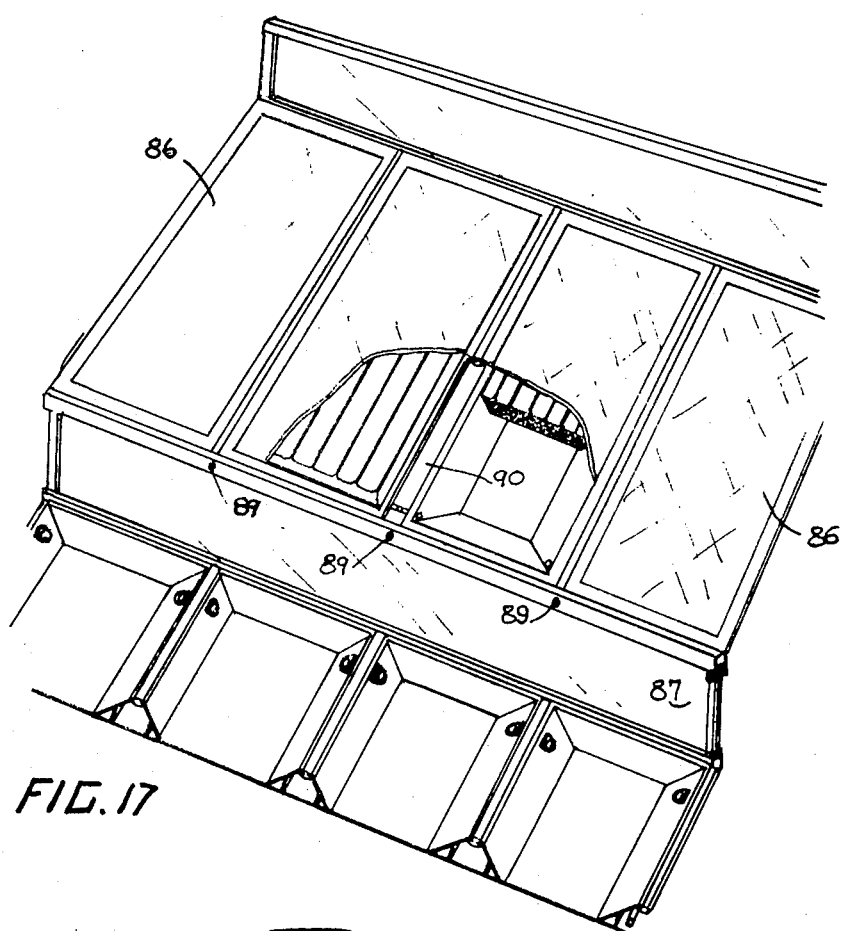
FIG. 17 is a detail of the panels of FIG. 16.
Figure 17A:
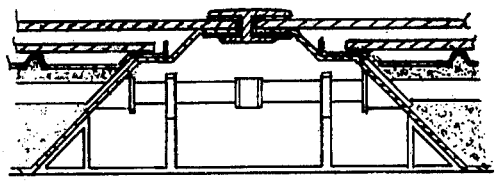

FIG. 17 is a further detail of the form shown in FIGS. 15 and 16 but showing how drains 89 can lead from gutters 90 beneath the junctions between panels so that if there is a leak from the pipe joining the panel, or during rainy weather water will discharge over the roof so formed.

Figure 19:
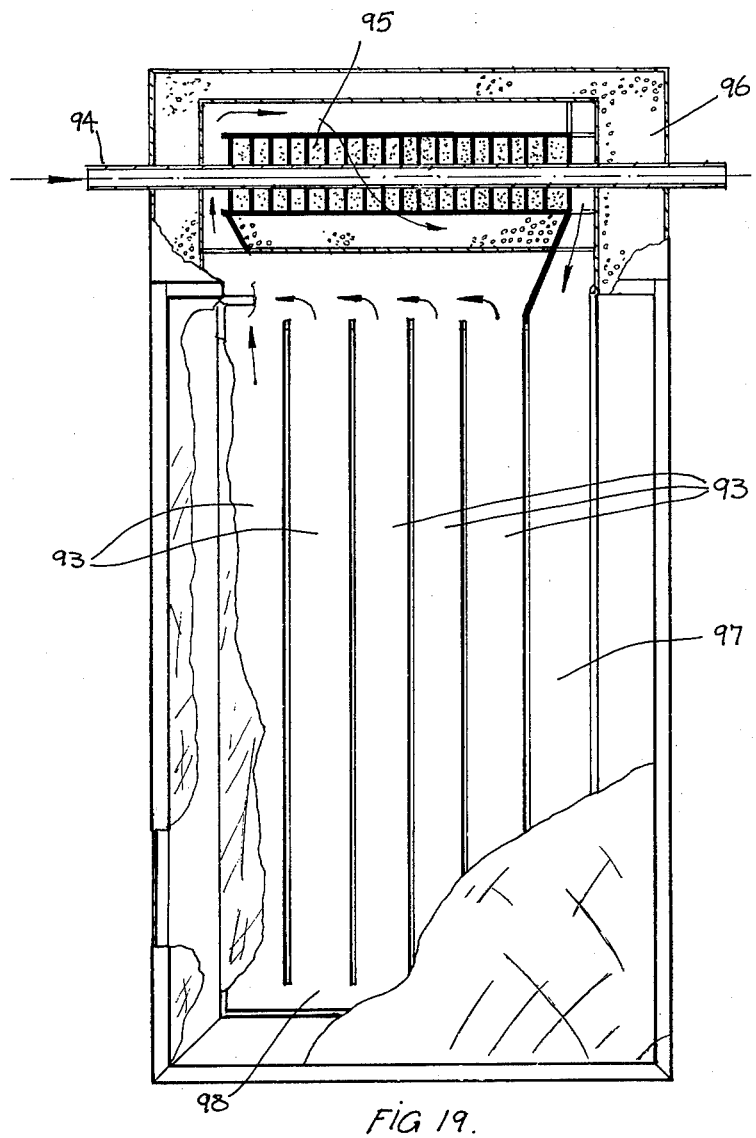
FIG. 19 is a more detailed section of a heat storage panel as associated with water flow to heat the water as it flows through the panel.

In FIGS. 18 and 19 is shown a different form of the invention in which a panel of the type described for instance in FIG. 1 feeds water into a common storage chamber 92, the water simply flowing into the chamber 92 from the ends of the water flow channels 93 and the water is then stored in the chamber 92, the chamber 92 having heat extraction means in the form of a pipe 94 through it which has on it a series of fins positioned in a chamber 95 which can transmit the heat from the water contained in the chamber 92 to the pipe 94 when a fluid is pumped through that pipe. Heat retaining crystals may fill the chamber 95.

Insulation for the chamber 92 is represented by 96.

Such a device can again be provided with closure means as described with reference to FIG. 13 to cut off heat losses from the panel when solar energy is insufficient to maintain the heat in the unit at a required amount.

Such a unit can conveniently be used as a storage heater and could be of considerable dimension and could for instance be used as an instantaneous water heater in that water pumped through the pipe 94 will absorb heat from the hot water within the chamber 92, this being aided by the fins 95.

FIG. 19 is a further view of the device of FIG. 18 showing how and when the channels 93 are arranged on an incline with the storage chamber 92 at a higher level, water will flow up these channels as it is heated to enter the heat exchanger storage chamber, but circulation is maintained by a difference in the temperature in the system and there is a return flow through the channel 97 back into a header 98 with which the channels communicate so that water will constantly circulate in the system and if the water in the chamber 92 transfers heat to fluid flowing through the pipe 94 the cooled water flows back through the channel 97 to be re-heated, the flow resulting because the water from the channels 94 is heated by the heat rays from the sun and water rises into the chamber 92.

Referring now in general to constructional features, the body of the unit is preferably constructed in either one of two ways, the one system consisting in moulding an outer skin in fibre glass or similar material, the outer skin containing the necessary channels in which the water is to be heated and having a support for the glass which is to define the trough or space through which the water flows, and the space between the outer skin of this member is then filled with foam plastic or the like and is sealed, whereby a strong structure results with the necessary heat insulation for the bottom of the trough, inlet and outlet channels being moulded into the structure where required. These channels can extend transversely at the top and bottom to allow side-by-side panels to be interconnected as described.

The second glass is also supported by the moulding but at a required distance from the main toughened glass which forms the other part of the water channel so that the moulding supports the first outer glass as well as the toughened water channel glass at the correct spacing to maintain a quiescent air space between the two glass panels and to support the inner toughened glass channel against outward deflection by water pressure from the channel, the moulding having a number of longitudinal upstanding walls or ridges on it which are of the same depth as the channel which is to be formed so that when the glass is bedded on a seal on the moulding around the edges of the glass, the walls or ridges will project up and they will be cemented or otherwise secured to the toughened glass panel to help to resist outward deflection on the toughened glass panel. As said, the widths of the ridges can offer more adhesive area than the perimeter seal to give even deflection of the glass. The sealing medium can be a silicon rubber cement. The ridges are preferably longitudinally arranged and transverse ridges can be used also, but preferably on the back of the panel.

According to a second method of polyurethane rigid foam moulding can be made to the shape of the panel and this can then be coated on its outside with a layer of fibre glass or similar material to give the necessary rigidity, and or water resistance, the advantage in both of these methods being that the polyurethane rigid foam or similar substance is completely sealed within the fibre glass or similar casing and thereby retains the gases which are an inherent part of the foaming and which have been shown to improve the thermal insulation characteristic of the panel while they are retained, the sealed outer skin ensuring that there is a relatively definite retention of these gases such as freon.

In the first method of course where the skin of fibre glass or the like is first moulded and the foam is then introduced, the mould will naturally have to be made in two parts which can be joined together to form the insulation cavity into which the foam is then injected.

It has also been found advantageous in some cases to cover the side of the panel which faces the sun with a suitable plastic such as that known under the trade mark ⇌PERSPEX" or "OROGLAS" instead of glass to give the quiescent zone between the outer glass panel and the cover and also it is possible to select the materials in such a way that those rays of the sun which have the highest absorption factor in the bed of water are admitted with the least restriction but generally our tests have shown that ordinary glass and a clear plastic are quite suitable as the heat from the suns rays can pierce these layers and are then effectively absorbed in the water which practice has shown need to have a depth of only perhaps one or two centimeters.

Examples of suitable materials;

Materials transparent to solar radiation glass, toughened glass, Isobornylmethacrylate Allyl Diglycol Carbonate Absorber materials ABS (Acrylonitrile butadiene-styrene terpolymer) Carbon black, plastic impregnated with carbon black, Black Ion Oxide, analine black Low heat emissivity materials light metals such as aluminium, also when vacuum coated on plastics or metal or electrodeposited

I claim:

1. A solar generator panel for heating water, comprising a housing (25), a trough (1) insertable into said housing (25), a water inlet (26) and water outlet (27), a first transverse distributor channel (23) communicating with said water inlet (26), a second transverse distributor channel (24) communicating with said water outlet, a series of parallel spaced walls (3) in said trough extending from said first distributor channel (23) and forming a plurality of parallel flow channels in said trough to contain water, said flow channels having a top (5), a cover which is transparent to solar radiation closing the top of said flow channels and bonded to said walls (3) to allow solar radiation to pass into said flow channels so as to absorb energy in the water from the radiation, and an absorber (9) for solar energy forming at least a water-supporting surface of said trough to absorb as heat that solar energy which passes through the water, and to reradiate and conduct such heat energy back to the water.

2. A solar generator panel according to claim 1 wherein said trough is itself formed of a material to absorb solar radiation which passes through the water.

3. A solar generator panel according to claim 1 wherein said trough (1) is coated on the inner surface with a solar absorber.

4. A solar generator panel according to claim 3 wherein the trough (1) is formed of a low heat emissivity material.

5. A solar generator panel according to claim 1 further comprising thermal insulation means on the rear of said absorber (9) to prevent heat loss to the atmosphere from said absorber.

6. A solar generator panel according to claim 1 further comprising a second transparent cover (16) spaced from and disposed above the first cover (5), said first cover being contractable by the water, so as to reduce heat loss to the atmosphere from said second cover (6).

7. A solar generator panel according to claim 1 further comprising a first adhesive line (15) disposed on said transparent cover (5) to attach and seal said cover (5) to said channels, and a plurality of second adhesive lines (17) for attachment of said cover to said walls (3).

8. A solar generator panel according to claim 7 wherein said first line (15) is proportioned to form a more resilient attachment of said cover (5) to said channels on said cover (5) than the attachment of said cover (5) to said walls by the plurality of said second adhesive lines (17).

9. A solar generator panel according to claim 1 wherein said trough (1) is supported in a housing (25) around its perimeter, a space being formed between said housing (25) and the back of the said trough, and further comprising thermal insulation means in said space to reduce radiation from the said trough to atmosphere.

10. A solar generator panel according to claim 9 wherein the housing (25) projects above the said trough (1) and comprising a transparent member spaced from said transparent cover to reduce radiation from said cover to the atmosphere.

11. A solar generator panel according to claim 1 wherein said inlets (26) and said outlets (27) communicate with said distributor channels (23,24) at each end thereof, respectively, so that a plurality of solar generator panels can be placed side-by-side to have common inlet (55,59) and outlet means, (56,60) respectively.

12. A solar generator panel according to claim 1 wherein said second transverse distributor channel (24) includes a shielded portion (36) to prevent solar rays from heating air trapped in said second channel above the water line at said outlet (27).

13. A solar generator panel according to claim 1 wherein the transparent cover (5) and said flow channels are formed of plastic, said cover (5) being transparent to the solar rays and said walls acting as a heat absorber, said cover (5) and said walls being joinable to headers (55,56) placeable at respective ends of said panel to communicate with said channels (24).

14. A solar generator panel according to claim 1 further comprising a plurality of thermal insulating shields (66,67) attached to said panel (65) to shield said transparent cover (5) against heat loss to the atmosphere in the absence of solar rays.

15. A solar generator panel according to claim 14 wherein said shields (66,67) are movable from a first position to a second position by thermal expansion bellows.

16. A solar generator panel according to claim 1 wherein said panels are adapted to be attached to supports to form roofing material for a structure.

17. A solar generator panel according to claim 16 wherein said panels are arrangeable side-by-side across the slope of a roof along different respective levels, windows (87) being formable between upper and lower levels of said panels.

18. A solar generator panel according to claim 1 wherein said panel includes an insulated storage chamber (92) adapted to receive water from said panel, and heat extraction means (94) disposed in said chamber (92) for drawing off heat from the water in said chamber when said heat extraction means (94) are actuated.

19. A solar generator according to claim 18 characterised in that the heat extracting means comprise a finned pipe through which fluid can be moved to extract heat from the water in the said chamber.

20. A solar generator according to claim 18 characterised by a circulatory channel in said panel connected to return water to the panel from the said chamber when the water in the said chamber is at a lower temperature than in the said panel.

21. A solar generator panel for heating water, comprising a housing (23), a trough (1) insertable into said housing (23), a series of parallel spaced walls in said trough forming a plurality of parallel flow channels (93) in said trough to contain water, said flow channels having a top, a cover (5) which is transparent to solar radiation closing the top of said flow channels to pass into said flow channels so as to absorb energy in the water from the radiation, a water storage (92) chamber being attached to said solar generator, said trough (1) and said chamber being formed with openings for water to pass from said trough to said chamber, said chamber having heat extraction means (94) for transmitting heat from said chamber upon pumping the heated water therefrom.

* * * * *